United States Patent [19]

Penney et al.

[11] 4,081,215

[45] Mar. 28, 1978

[54] STABLE TWO-CHANNEL, SINGLE-FILTER SPECTROMETER

[75] Inventors: Carl M. Penney, Clifton Park; Marshall Lapp, S. Albany, both of N.Y.

[73] Assignee: General Electric Company, Schenectady, N.Y.

[21] Appl. No.: 687,558

[22] Filed: May 18, 1976

[51] Int. Cl.² .................. G01J 5/48; G01J 3/44
[52] U.S. Cl. .................. 356/45; 73/355 R; 356/75; 356/178
[58] Field of Search ............ 356/51, 45, 75, 178, 356/186, 189, 106 S, 187; 73/355 R

[56] References Cited

U.S. PATENT DOCUMENTS

| | | | |
|---|---|---|---|
| 2,941,444 | 6/1960 | Frykman | 356/51 |
| 3,909,132 | 9/1975 | Barrett | 356/45 |
| 3,986,775 | 10/1976 | Chang et al. | 356/45 |

OTHER PUBLICATIONS

M. Lapp, "Flame Temperature From Vibrational Raman Scattering", pp. 107–145 (Plenum Press, 1974).
M. E. Mack, "Remote Raman Temperature Measurement With a Dye Laser", *Laser Raman Gas Diagnostics,* pp. 353–359 (Plenum Press, 1974).
M. Lapp et al., "Vibrational Raman Scattering Temp. Meas.", *Optical Communications,* pp. 195–200 (Oct. 1973).
M. Lapp et al., "Raman Scattering From Flames", *Science,* pp. 1112–1115 (Mar. 10, 1972).
D. Hartley et al., "Physics in Combustion Research", *Physics Today,* pp. 36, 37, 39–41, 43, 46, 47 (Dec. 1975).

*Primary Examiner*—Vincent P. McGraw
*Attorney, Agent, or Firm*—Marvin Snyder; Joseph T. Cohen; Jerome C. Squillaro

[57] ABSTRACT

An instrument to make simultaneous accurate measurements of the intensity of light in each of two (or more) spectral channels using a single interference filter employs mirrors or prisms to break up the observed light beam into two (or more) beams, propagating in slightly different directions. The angle dependence of the filter spectral passband provides two distinct spectral channels which are focused onto separate detector elements. Advantages of this instrument are illustrated by its application for remote point Raman temperature measurements in hot gases.

17 Claims, 5 Drawing Figures

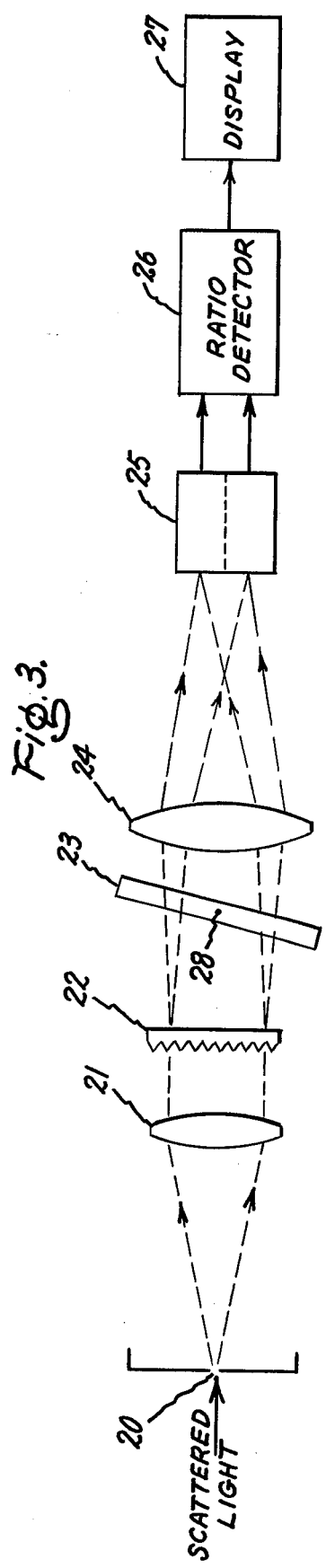

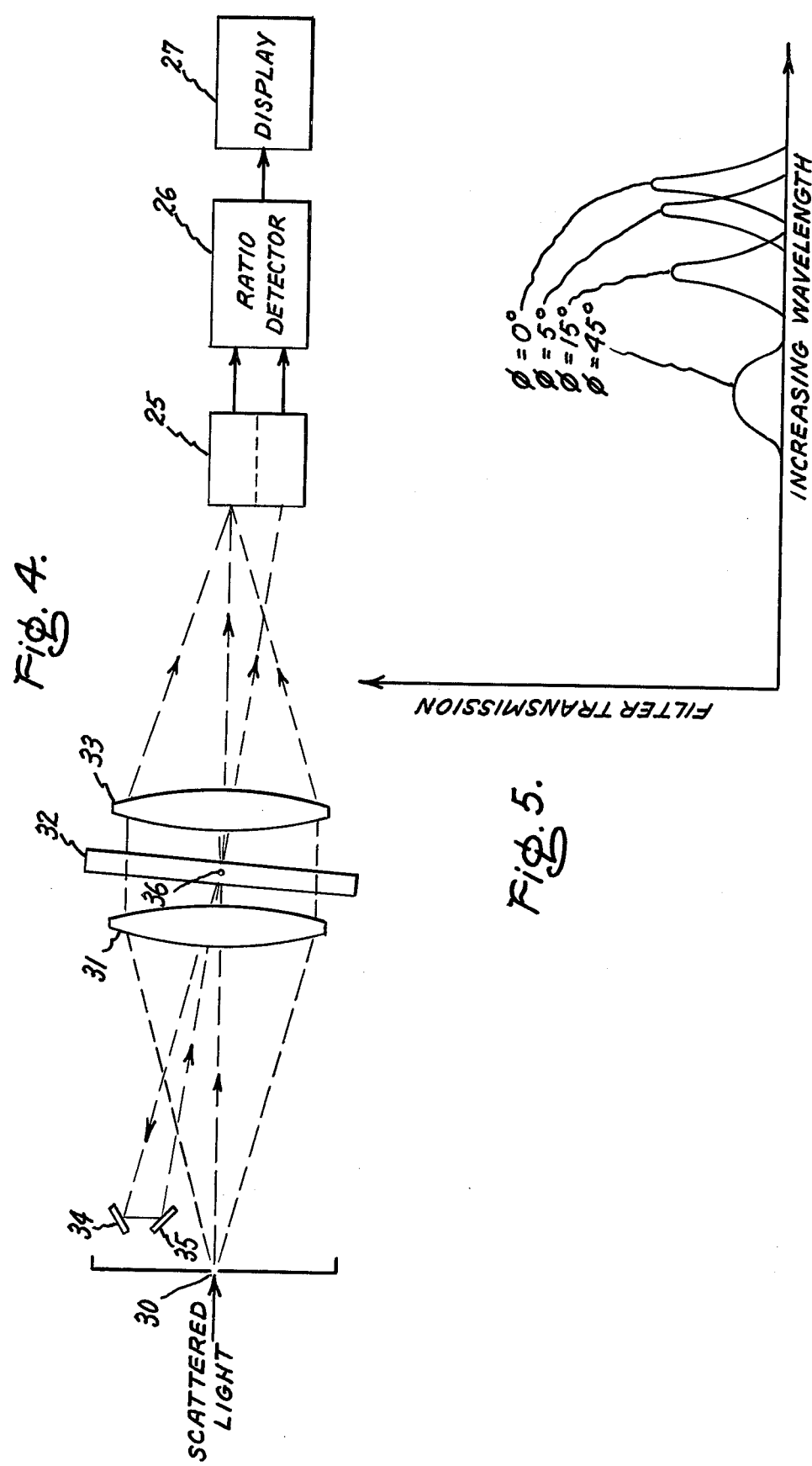

STABLE TWO-CHANNEL, SINGLE-FILTER SPECTROMETER

INTRODUCTION

This invention relates to spectrometric instruments, and more particularly to instruments employed to observe simultaneously several spectral bands of light emitted from or scattered by a medium, in order to ascertain properties of the medium. The principles of the invention and some of its desirable characteristics can be illustrated by describing its application to Raman temperature measurements in a hot gaseous medium such as a flame.

When a light beam passes through a flame, part of the light interacts with molecular species in the flame and is diverted out of the beam. One of the beam diverting processes is commonly known as Raman scattering, the term "scattering" denoting a re-emission process that is effectively instantaneous. This process involves an exchange of a significant amount of energy between the scattered light photon and the scattering molecules, causing the scattered light to undergo substantial shifts in wavelength. The resulting bands of scattered light are characteristic of the particular scattering molecule. Intensity of each band is proportional to the number of molecules in the particular initial state leading to that band; that is, intensity of a Raman scattering line is directly proportional to the numerical density of corresponding molecules and is independent of the numerical density of other molecules. Thus Raman scattering can be employed to provide direct information about the consistency and excited state populations of molecules in a system.

For gases in thermal equilibrium, the Raman spectrum depends on both density and temperature. The temperature dependence is independent of density and sufficiently strong in appropriate spectral regions to allow sensitive temperature measurements to be made from cryogenic through combustion temperatures. However, the spectral resolution channels must be stable relative to each other and, because of the weakness of the Raman scattering, any spectral resolution instrument employed must provide very high light throughput. These requirements are met by the compact, rugged, stable and efficient apparatus of the present invention.

Temperature measurements from Raman spectra may be made by obtaining the ratio of intensities of two distinct Raman lines or two adjacent spectral bands along the Raman spectra. If the two intensities are measured simultaneously, high temporal resolution can be obtained and real-time measurements are possible. Further, since the Raman measurements can be confined to adjacent narrow bands, they are affected essentially equally by extraneous effects which cancel out when a ratio of intensities is taken. One embodiment of the invention described herein concerns making flame temperature determinations by obtaining the ratio of scattering intensities in, for example, the fundamental band and first upper state band of the vibrational Raman scattering from a molecular species in the flame.

Accordingly, one object of this invention is to provide a simple, rugged, stable and efficient instrument to measure the intensities of two or more spectral bands of light.

Another object of this invention is to provide a compact, single-filter, two-channel flame temperature measuring device responsive to vibrational Raman scattering of laser light.

Another object is to provide a simplified method and apparatus for measuring, in real-time, a ratio fo the fundamental band and first upper state band of the vibrational Raman scattering of laser light from a molecular species in a flame.

Briefly, in accordance with a preferred embodiment of the invention, a stable, two-channel spectrometer monitors light emanating from a medium in determining a property of the medium. The spectrometer comprises means for collimating light emanating from the medium and means for splitting the collimated light into two beams. Each of the two beams is directed to pass through the same interference filter at a different angle, respectively, each angle being chosen such that the corresponding passband of the filter coincides, respectively, with one of the two bands to be observed. Optical detecting means in the form of a split, single optical detector can be used, with each of the two beams emanating from the filter impinging on a separate sensing location, respectively, of the detector. Means responsive to the detector are provided for producing an indication of the ratio of light intensity on each sensing location of the detector.

In accordance with another preferred embodiment of the invention, a method of determining flame temperature wherein light from a laser is scattered by a flame comprises collimating a narrow portion of the scattered light, splitting the collimated light into two beams, and directing each of the two beams to pass, in common, through an interference filter at a different angle, respectively, each angle being chosen such that the corresponding passband of the filter coincides with each of two scattering bands to be observed. The intensity ratio of the two beams emerging from the single filter is measured to produce an indication of flame temperature.

BRIEF DESCRIPTION OF THE DRAWINGS

The features of the invention believed to be novel are set forth with particularly in the appended claims. The invention itself, however, both as to organization and method of operation, together with further objects and advantages thereof, may best be understood by reference to the following description taken in conjunction with the accompanying drawings in which:

FIG. 3 is a schematic illustration of light detection apparatus employed in a first embodiment of the invention;

FIG. 4 is a schematic illustration of light detection apparatus employed in a second embodiment of the invention; and FIG. 5 is a graphical illustration of light transmission through the interference filters employed in the apparatus of FIGS. 3 and 4, for a range of incident angles of light striking the filters.

DESCRIPTION OF TYPICAL EMBODIMENTS

Figure 1:
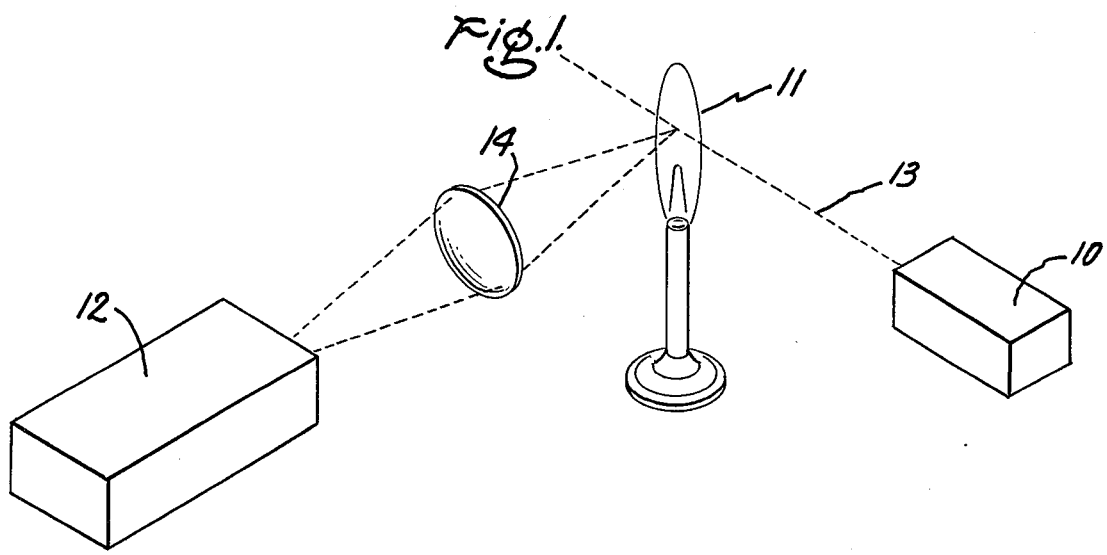
FIG. 1 is a schematic illustration of a flame-illuminating and scattered light-detecting arrangement employed in the invention.

In FIG. 1, a source of highly monochromatic light 10, such as a laser, is directed along an axis 13 to illuminate a portion of a flame 11. Light detection apparatus 12 is directed at the flame, typically off-axis from the beam produced by laser 10. Light scattered by gas molecules in the flame is focused onto the input of optical detection apparatus 12 by optical focusing means 14, shown as a lens.

Figure 2:
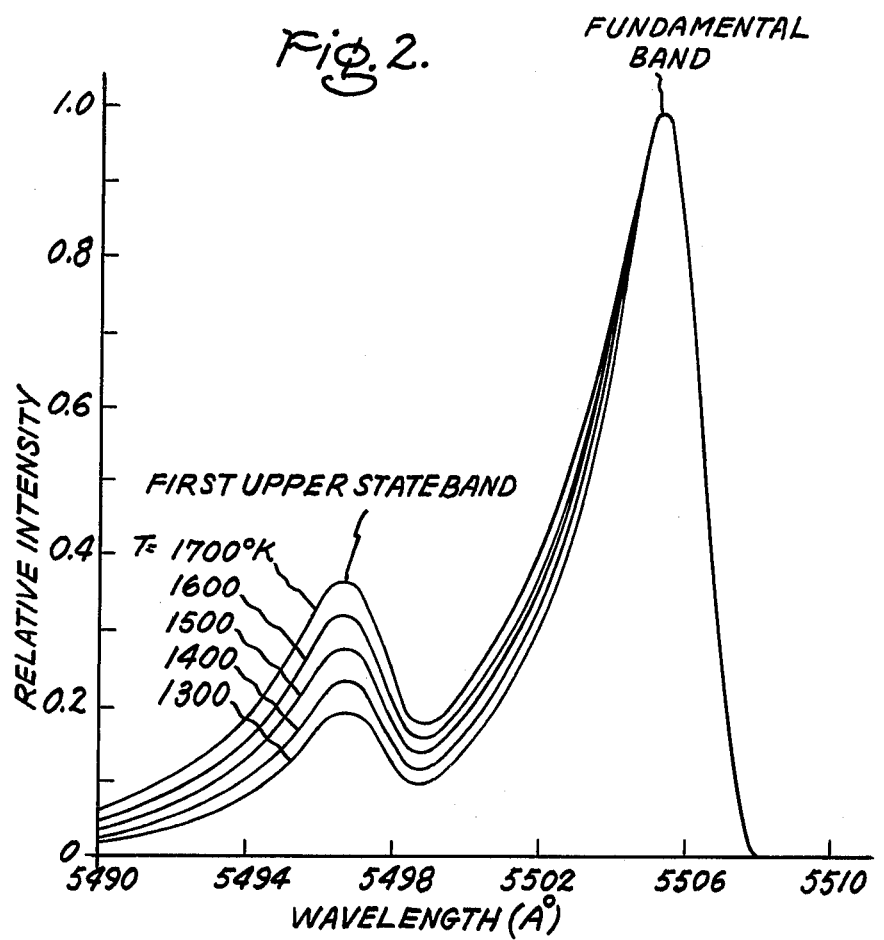
FIG. 2 is a graphical illustration of temperature dependence of vibrational Raman scattering from nitrogen excited at a wavelength of 4880 angstroms.

FIG. 2 illustrates the spectral distribution of vibrational Raman scattering from nitrogen molecules excited by light of 4880 angstroms wavelength. These curves are set forth by M. Lapp, "Flame Temperatures From Vibrational Raman Scattering" in *Laser Raman Gas Diagnostics* edited by M. Lapp and C. M. Penney, page 107, at 122, (Plenum Press, 1974). The apparatus of FIG. 1, with laser 10 emitting light of 4880 angstroms wavelength, can therefore be employed to determine flame temperatures by measuring the ratio of scattering intensities in the fundamental band and first upper state band of the vibrational Raman scattering from nitrogen molecules in the flame. These bands can be separated in the scattered light, so that their indensity ratio can be determined by use of a grating spectrometer or an interference filter, the latter being more desirable in that interference filters can collect more light at given cost, are more rugged, and are simpler to mount. It is also desirable to observe the fundamental band and first upper state band simultaneously in order to collect equivalent data and allow time resolution in the order of one microsecond or better using a pulsed laser for laser 10.

In the embodiment of light detection apparatus illustrated in FIG. 3, monochromatic light scattered from a small region in a flame (typically a region of cylindrical volume about 1 millimeter in length and 0.1 millimeter in diameter) is collected and focused, in the manner shown in FIG. 1, on a slit 20. Light passing through the slit is collimated by lens 21 and directed onto biprism 22 (preferably a Fresnel biprism to decrease possible sensitivity to spatial variations). The biprism breaks up the beams of light incident thereon into two beams. Both beams emerging from the biprism impinge upon an interference filter 23.

The incident angles of the two beams directed onto filter 23 are selected, by proper orientation of the filter about its tilt axis 28, such that the corresponding passbands of the filter coincide with the two distinct Raman scattering bands to be observed. Since the ratio of scattering intensities in the fundamental and first upper state bands of the vibrational Raman scattering is desired, where the scattering is produced by nitrogen gas the passbands would preferably be centered about 5506 angstroms and 5496 angstroms, respectively, each with a bandwidth of, for example, approximately 5 angstroms.

Upon emerging from filter 23, the beams are separated spatially by being refocused through a lens 24 onto separate sensing locations 25. These locations may comprise two separate sensing locations of a single composite detector such as a split photodiode of the type used for position sensing, a multicathode photomultiplier, or an optical multi-channel detector such as the Optical Multichannel Analyzer sold by Princeton Applied Research Corporation, Princeton, N.J., under the trademark OMA. Use of a single detector can increase relative stability between any two channels of detection.

Output signals from each detector channel 25, corresponding to intensity of the light beam detected by the respective channel, are supplied to a ratio detector circuit 26 which produces an output signal of amplitude proportional to the ratio of input signals supplied thereto. The output signal of ratio detector means 26 is furnished to display apparatus 27, such as a voltmeter, which produces a visible indication of this output signal amplitude.

In operation, the light beam detected by one of the channels of photodetector 25 corresponds to the fundamental band of scattered light, while the beam detected by the other of the photodetector channels corresponds to the first upper state band of the scattered light. Hence the output signals of photodetector 25 are indicative of the amplitudes of these two light beams, respectively, and display apparatus 27 thus produces an indication of the ratio of intensity of the two bands of scattered light. Since this ratio is indicative of temperature of the molecules that scatter the laser light, the indication produced by display apparatus 27 is proportional to this temperature. In this fashion, therefore, flame temperature at a point therein may be remotely determined.

Correct orientation of interference filter 23 with respect to the light beams impinging thereon is critical to successful operation of the system shown in FIG. 3. When the angle between a light beam and the normal to an interference filter is increased from zero, the filter passband moves toward shorter wavelengths. This behavior is illustrated graphically in FIG. 5. Additionally, as shown in FIG. 5, the passband shape remains nearly constant for small angles $\phi$ between a light beam incident on an interference filter such as filter 23 shown in FIG. 3, and the normal to the filter (that is, where $\phi$ is less than about 20°). The center wavelength at any angle $\phi$ may be expressed as:

$$\lambda(\phi) = \lambda_0 [1 - (\sin^2\phi)/n^2]$$

where $\lambda_0$ is the center wavelength for normal light incidence (that is, where $\phi = 0$), and $n$ is the effective refractive index of the filter layers (typically 1.45). The above equation may be used to calculate the angles $\phi$ providing passbands at 5506 angstroms and 5496 angstroms, for example, these angles corresponding to the fundamental band and the first upper state band of nitrogen excited at 4880 angstroms. The resulting angles are shown in Table I.

TABLE I

Angle Dependence of Interference Filter Passband for n = 1.45

| $\lambda_0$ (angstroms) | $\phi$ (5506 angstroms) | $\phi$ (5496 angstroms) | $\Delta\phi$ |
|---|---|---|---|
| 5506 | 0° | 5.011° | 5.011° |
| 5509.59 | 3° | 5.842° | 2.842° |
| 5515.97 | 5° | 7.081° | 2.081° |
| 5545.91 | 10° | 11.198° | 1.198° |

From the above table, it can be concluded that the scattered light collimation must be on the order of 0.3° to 1° in the plane perpendicular to the tilt axis 28 of filter 23. That is, in the plane perpendicular to the filter tilt axis 28, the light beams striking the filter must be collimated to an angle substantially smaller than $\Delta\phi$, in order that the broadening of each passband due to the imperfection of collimation be much less than the separation between passbands. The length of slit 20 (normal to the plane in which FIG. 3 is shown) is greater than its width, allowing collimation in the plane passing through the slit and including the filter tilt axis to be about 2°. These collimation angles (which represent the angle of divergence between the most widely spaced rays in either beam directed onto the interference filter) are easily realized with the structural configuration shown in FIG. 3, and the angle magnitudes required by the structure are convenient for a compact, rugged design.

FIG. 4 illustrates a second embodiment of the light detection apparatus of the invention, which utilizes multiple reflections to provide a second light beam originally reflected from the first surface of the interference filter irradiated by the first collimated light beam. Specifically, as in the embodiment of FIG. 3, monochromatic light scattered from a small region in a flame (again, typically a region of cylindrical volume about 1 millimeter in length and 0.1 millimeter in diameter) is collected and focused, in the manner shown in FIG. 1, on a slit 30. Light passing through the slit is collimated by lens 31 and directed onto an interference filter 32. Filter 32 is oriented about its tilt axis 36 such that the incident angle of the collimated light beam from slit 30 coincides with the angle necessary to allow light of wavelength corresponding to the first upper state Raman scattering band to pass through the filter. This light, upon emerging from the filter is refocused by a lens 33 onto one of the channels of split photodetector 25, in a manner similar to that in the apparatus shown in FIG. 3.

Because light from slit 30 impinges on filter 32 at an incident angle slightly displaced from the normal, the first surface of filter 32 irradiated by the scattered light reflects the light back through collimating lens 31 at an angle offset from the path of scattered light passing through slit 30. This reflected beam is directed onto a first reflector, such as a mirror 34, which reflects the light onto a second reflector, such as a mirror 35, from whence the light beam is reflected back through collimating lens 31 toward interference filter 32. The incident angle of this reflected light beam on filter 32 is selected to coincide with the angle necessary to allow light of wavelength corresponding to the fundamental Raman scattering band to pass through filter 32. Light in the fundamental Raman scattering band thus emerging from interference filter 32 is refocused by lens 33 onto the second channel of split photodetector 25. As in the apparatus of FIG. 3, an output signal from each channel of photodetector 25 is supplied to ratio detector 26, and an output reading, which may be calibrated in terms of temperature of the flame being monitored, is provided by display apparatus 27. Those skilled in the art will appreciate that the apparatus of FIG. 4 may be somewhat less stable, albeit more efficient, than the apparatus of FIG. 3.

The angle dependence of interference filter 32 of FIG. 4, like that of interference filter 23 of FIG. 3, is set forth in Table I, supra. Moreover, as with the apparatus of FIG. 3, scattered light collimation by lens 31 must be on the order of 0.3° to 1° in the plane perpendicular to filter tilt axis 36 and about 2° in the plane which coincides with the filter tilt axis and the longitudinal axis of slit 30.

FIG. 5, as previously mentioned, illustrates the effect of a change in incident angle of light impinging on a filter, such as filter 32 shown in FIG. 4, as a result of tilting the filter. Thus, as the filter is tilted to increase the incident angle $\phi$ from zero degrees toward 45°, transmissivity of the filter descreases, and selectivity of the filter decreases due to increasing bandwidth of the filter passband with increasing incident angle $\phi$. As the incident angle increases, moreover, the center wavelength of the filter passband decreases so that, at the smaller angles of incidence, the fundamental Raman scattering band may be passed by the filter while, at the larger angles of incidence, the first upper state Raman scattering band may be passed by the filter. Consequently, use of two simultaneous beams to pass through the interference filter in the apparatus of either of FIGS. 3 and 4 allows simultaneous determination of light intensity in the vibrational Raman scattering fundamental and first upper state bands, the ratio of which is employed to provide real-time temperature data.

The foregoing describes a single-filter, two-channel spectrometer responsive to laser light scattered or reflected by a medium, which constitutes a simple, rugged, stable and efficient instrument to measure the ratio of intensities of two beams of monochromatic light having two different wavelengths. The apparatus permits measuring, in real-time, a ratio of the fundamental band and first upper state band of the vibrational Raman scattering of laser light from a molecular species in a flame.

Those skilled in the art will appreciate that the spectrometric instrument of the instant invention is applicable to measurments in media other than molecular species in a flame, wherein a physical quality of the medium produces a characteristic change in the monitored spectra. For example, temperature measurements of the atmosphere may be made in the manner herein described, the measurements being based on rotational Raman scattering rather than vibrational Raman scattering. More generally, color comparisons also may be made by monitoring light emanating from a medium.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. A spectrometer for making simultaneous measurements of light intensity in two spectral channels, comprising:
    an interference filter;
    means for splitting monitored light into two simultaneous collimated beams, each beam being directed in a separate direction, respectively, toward said filter such that the incident angle of each beam upon said filter coincides with the incident angle required for passage through said filter of a separate wavelength band, respectively, to be observed;
    optical detecting means responsive to each separate beam, respectively, emerging from said filter; and
    means responsive to said detecting means for producing an indication of the intensities of the beams emanating from said filter.

2. The apparatus of claim 1 wherein said means for splitting said collimated, monitored light into two beams includes a Fresnel biprism situated in the path of said monitored light.

3. The apparatus of claim 1 wherein said means for splitting said collimated, monitored light into two beams includes reflecting means situated in the path of light reflected by said interference filter and directing said light reflected by said interference filter back to said interference filter at a predetermined angle with respect to the direct path of said monitored light toward said interference filter.

4. The apparatus of claim 3 wherein said reflecting means comprises first and second reflectors, said first reflector being situated in the path of light reflected by said interference filter and directing said light reflected by said interference filter onto said second reflector, said second reflector reflecting said light impingent thereon back to said interference filter at said predetermined angle with respect to the direct path of said monitored light toward said interference filter.

5. In a Raman temperature probe wherein light from a laser is scattered by a gaseous medium, apparatus for determining the gaseous medium temperature comprising:
an interference filter;
means for splitting said light scattered by said gaseous medium into two simultaneous collimated beams, each of said beams being directed so as to pass through said filter at a different angle, each angle being chosen such that the corresponding passband of said filter coincides, respectively, with each of two scattering bands to be observed;
optical detecting means responsive simultaneously to each separate beam emerging from said filter; and
means responsive to said detecting means for producing an indication of the ratio of intensities of the beams emanating from said filter.

6. The apparatus of claim 5 wherein said optical detecting means comprises a split, single optical detector, each of said two beams emanating from said filter impinging on a separate sensing location, respectively, of said detector, and wherein said means responsive to said detecting means produces an indication of the ratio of light intensity on each sensing location of said detector.

7. The apparatus of claim 5 wherein said means for splitting said scattered light into two collimated beams comprises a Fresnel biprism situated in the path of said light scattered by said gaeous medium.

8. The apparatus of claim 5 wherein said means for splitting said scattered light into two collimated beams comprises reflecting means situated in the path of light reflected by said interference filter and directing said light reflected by said interference filter back to said interference filter at a predetermined angle with respect to the direct path of said light scattered by said gaseous medium toward said filter.

9. The apparatus of claim 8 wherein said reflecting means comprises first and second mirrors, said first mirror being situated in the path of light reflected by said interference filter and directing said light reflected by said interference filter onto said second mirror, said second mirror reflecting light impinging thereon back to said interference filter at said predetermined angle with respect to the direct path of light scattered by said gaseous medium toward said filter.

10. The apparatus of claim 6 wherein said means for splitting said scattered light into two collimated beams comprises a Fresnel biprism situated in the path of said light scattered by said gaseous medium.

11. The apparatus of claim 6 wherein said means for splitting said scattered light into two collimated beams comprises reflecting means situated in the path of light reflected by said interference filter and directing said light reflected by said interference filter back to said interference filter at a predetermined angle with respect to the direct path of said light scattered by said gaseous medium toward said filter.

12. The apparatus of claim 5 wherein said optical detecting means comprises an optical multichannel detector, each of said two beams emanating from said filter impinging on a separate sensing location, respectively, of said detector, and wherein said means responsive to said detecting means means produces an indication of the ratio of light intensity on any pair of sensing locations of said detector.

13. The apparatus of claim 5 wherein said optical detecting means comprises a multicathode photomultiplier, each of said two beam emanating from said filter impinging on a separate sensing location, respectively, of said photomultiplier, and wherein said means responsive to said detecting means produces an indication of the ratio of light intensity on any pair of sensing locations of said photomultiplier.

14. A method of measuring intensity of light in two spectral bands comprising:
orienting an interference filter of predetermined passband such that light in one of said spectral bands passes through said filter and light in the other of said spectral bands is reflected from said filter; and
reflecting the light reflected from said filter back to said filter at an angle such that the filter passband coincides with said other of said spectral bands.

15. A method of determining intensity in two spectral bands of incident light simultaneously comprising:
splitting said incident light into two simultaneous collimated beams; and
directing each of said beams to pass through an interference filter at a different angle, respectively, with said filter.

16. A method of determining temperature of a gaseous medium wherein monochromatic light undergoes Raman scattering by said gaseous medium, comprising:
collimating a portion of the light scattered by said gaseous medium;
splitting the collimated light into two beams;
directing each of said two beams to pass, simultaneously and in common, through an interference filter at a different angle, respectively, each said angle being chosen such that the corresponding passband of said filter coincides, respectively, with each of two scattering bands to be observed; and
measuring the intensity ratio of said two beams emerging from said filter to provide an indication of temperature of said gaseous medium.

17. A method of determining temperature of a gaseous medium wherein monochromatic light undergoes Raman scattering by said gaseous medium, comprising:
collimating a portion of the light scattered by said gaseous medium;
orienting an interference filter of predetermined passband such that collimated, scattered light in one spectral band passes through said filter and in a second spectral band is reflected from said filter;
reflecting the light reflected from said filter back to said filter at an angle such that the filter passband coincides with the second spectral band; and
measuring the intensity ratio of said first and second spectral bands emerging from said filter to provide an indication of temperature of said gaseous medium.

* * * * *